Figure 4:
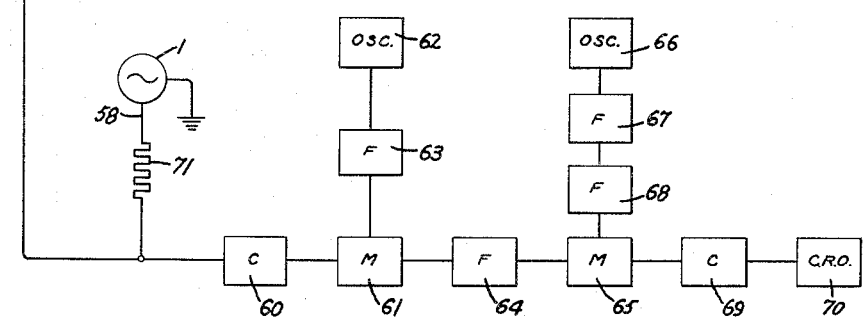

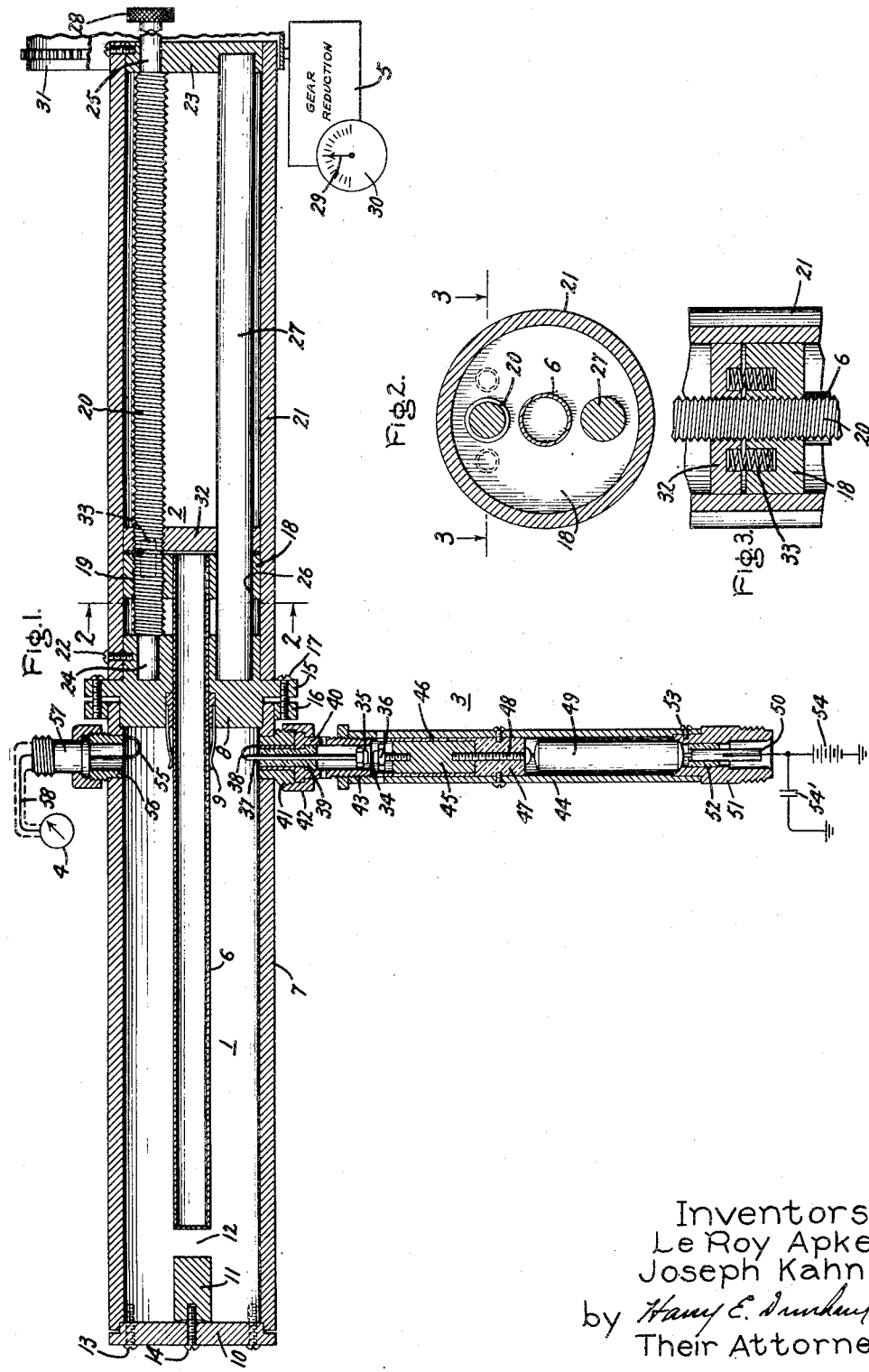

Inventors:
Le Roy Apker,
Joseph Kahnke,
by Harry E. Dunham
Their Attorney.

Patented Dec. 12, 1950

2,534,098

UNITED STATES PATENT OFFICE 2,534,098

ULTRA HIGH FREQUENCY WAVE GENERATOR

LeRoy Apker, Niskayuna, and Joseph Kahnke, Schenectady, N. Y., assignors to General Electric Company, a corporation of New York Application June 23, 1945, Serial No. 601,125

13 Claims. (Cl. 250—37)

Our invention relates to ultra high frequency apparatus and has as its primary object to provide a new and improved meter for measuring the frequency of ultra high frequency waves.

In the copending application of LeRoy Apker, Serial No. 601,124, filed June 23, 1945, now Patent No. 2,518,113, and assigned to the same assignee as the present invention, there is disclosed apparatus for analyzing ultra high frequency waves to determine the frequency or spectrum of such waves which employs a variable oscillator to provide a wave which may be compared visually by means of a cathode ray tube with a received wave. The received waves are variable over a wide frequency range and the frequency of the oscillator is variable over an equal range of megacycles, the average range of the oscillations being considerably higher than that of the received waves whose frequency is to be determined. It has been found that, in analyzing ultra high frequency waves with such or similar apparatus, the determination of the frequency of the output wave of the variable oscillator with sufficient accuracy presents a major problem. Thus, where it is desired to analyze waves in the range of, for example, from 500 to 4000 megacycles by a single tuning operation, heretofore there has not been available an ultra high frequency source variable over this range. When a higher frequency oscillator is employed which covers the same number of megacycles in a higher frequency range, recourse must be had to some additional means for measuring the frequency of such an oscillator before the frequency characteristics of the received wave can be determined with sufficient accuracy.

It is an object of our invention to provide a new and improved wavemeter for use with an ultra high frequency spectrum analyzer for measuring the frequency of a received wave.

It is another object of our invention to provide a new and improved ultra high frequency pulse generator.

It is a further object of our invention to provide a new and improved variable ultra high frequency pulse generator characterized by its provision of a relatively uniform power output over a wide frequency range.

It is a still further object of our present invention to provide a new and improved means for exciting a cavity resonator.

It is still another object of our invention to provide an easily adjusted variable ultra high frequency pulse generator which provides a sufficiently strong output signal over a wide frequency range to facilitate analysis of ultra high frequency spectra.

It is a still further object of our invention to provide a new and improved spark exciter.

It is still another object of our invention to provide a new and improved generator for supplying impulses to a wave transmission system.

One of the features of our invention is the employment in an ultra high frequency wavemeter of a cavity resonator of variable dimensions excited by a spark gap to produce an ultra high frequency wave, the frequency of which is variable and accurately determinable.

Figure 5:
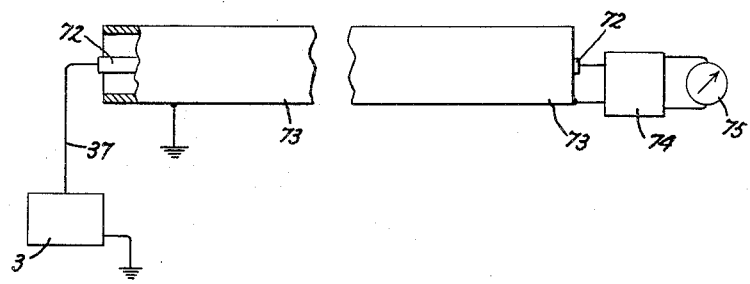
Figure 6:
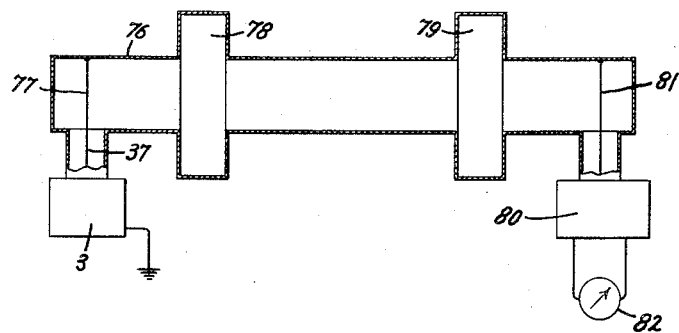

For a better understanding of our invention, reference may be had to the following description taken in connection with the accompanying drawing and its scope will be pointed out in the appended claims. Fig. 1 is a longitudinal sectional view of a wavemeter suitably embodying the invention; Fig. 2 is a transverse sectional view taken along the line 2—2 of Fig. 1; Fig. 3 is a portion of a longitudinal sectional view taken along the line 3—3 of Fig. 2; Fig. 4 illustrates diagrammatically an ultra high frequency spectrum analyzer embodying the wavemeter of Fig. 1; and Figs. 5 and 6 illustrate schematically modifications of our invention for determining resonance points in broad band transmission systems.

Referring to Fig. 1, we have there illustrated the wavemeter as comprising a cavity resonator 1 of the concentric conductor type and a mechanism 2 for varying the dimensions of the cavity resonator. The cavity is excited by an exciting means 3 to supply a wave of variable frequency to an indicating meter 4, the frequency of the wave being indicated by a suitable measuring means 5.

The cavity resonator 1 comprises a centrally positioned inner conductor 6 and a tubular outer conductor 7 which are short-circuited at one end by means of an end wall 8 and a plurality of resilient fingers 9 connected to the end wall 8 and engaging the outer surface of conductor 6. An end wall 10 closes the opposite end of the resonator and supports within the resonator a stub conductor 11 of the same outer diameter as the conductor 6 and separated from the adjacent end of the conductor 6 by a gap 12 which is adjustable in length in a manner to be described later. Preferably, the conductors 6, 7 and the stub conductor 11 are formed of a good conductive metal, such as copper or silver. The end wall 10 may be attached to the outer conductor 7 by means of screws 13 and the stub conductor 11 may similarly be supported from the end wall 10 by a screw 14. At the opposite end of the cavity resonator, the end wall 8 is provided with a flange 15 which overlies a flange 16 connected to the outer wall of conductor 7 and is clamped thereto by means of a plurality of screws 17. As thus constructed, the cavity resonator 1 comprises an open-ended quarter wave length resonant transmission line.

The mechanism 2 for adjusting the position of inner conductor 6 within the cavity resonator 1 to adjust the dimensions of the resonator comprises a piston 18 secured to the external end of conductor 6 and having a threaded transverse hole 19 which engages the threads on a longitudinal screw 20. The piston 18 is movable longitudinally within a cylinder 21, which is illustrated as of the same dimensions as the outer conductor 7 and is coaxially aligned with the outer conductor 7. One end of the cylinder 21 is attached to the end wall 8 by means of a plurality of screws 22 and its other end is closed by an end wall 23. The screw 20 is provided with bearing surfaces 24, 25 at its opposite ends which are journalled, respectively, in the end walls 8, 23 and which permit rotational but prevent axial motion of the screw 20. In addition to the threaded aperture 19, the piston 18 is provided with a transverse opening 26 through which passes a guide rod 27, the guide rod 27 being supported also by the end walls 8, 23. The position of the piston 18 and, consequently, of the inner conductor 6 may be adjusted by means of an externally accessible adjusting means, such as a knob 28, which is attached to the external end of the screw member 20. The position of the piston 18 within the cylinder 21 and the dimensions of the gap 12 may be measured by means of an indicating means 5 which comprises a pointer 29 which cooperates with a scale 30 and is connected by means of any suitable gear arrangement (not shown) or similar connecting means with a drum 31 attached to the external end of the screw 20 and actuated by the knob 28. The scale 30 may indicate directly the resonance frequency of the resonator 1 as the length of the open-ended quarter wave length transmission line 6, 7 is varied.

Means are provided to prevent blacklash in the adjusting of the piston 18 by means of the screw 20 and comprises a follow-up piston 32 which likewise is in threaded engagement with the screw 20 and which is resiliently biased with respect to the piston 18 by a plurality of spring members 33. The structure of this portion of the mechanism 2 may best be seen by reference to Figs. 2 and 3 in which the follow-up piston 32 and the piston 18 are shown as slidable along the guide rod 27 and engaging the threads of screw 20.

The means 3 for exciting the cavity resonator 1 comprise a spark gap 34 formed by a pair of electrodes 35, 36 of a suitable metallic material, such as tungsten, the electrode 35 being connected by a conductor 37 to an input electrode or coupling loop 38 which extends into the cavity resonator 1. While the input electrode 38 has been illustrated as a coupling loop, any other suitable exciting electrode means may be employed. The conductor 37 is supported by an insulator 39 which is contained within a sleeve member 40 which passes through housing member 41 supported within a lateral opening in the conductor 7. The housing member 41 is externally threaded to engage a cap 42 to support the sleeve 40 and the electrode 35 in the desired position. The sleeve 40, at its end remote from the resonator 1, is provided with external threads 43 which engage cooperating threads within a metal tube 44 and which provide means for adjusting the length of gap 34. The electrode 36 is supported from a cylindrical conductive plug 45 which lies within the tube 44, being insulated therefrom by means of a tubular insulator 46. The insulator 46 may be formed of any suitable low loss insulating material, for example polystyrene or a vitreous material, and is provided at one end with a solid portion 47 through which extends a screw 48 which engages the plug 45 and forms a conductive connection between that plug and a resistor 49 supported within the tube 44. The resistor 49 may be of any suitable type, for example a conventional carbon resistor. At one end, the resistor is connected to the screw 48 and at its opposite end, to a female contact 50 which is insulatingly supported within a closure member 51 by means of an insulator 52. The closure member 51 may be secured to the end of the tube 44 by screws 53. The female contact 50 provides means for connecting the resistor 49 to a suitable source of unidirectional voltage of high value, represented conventionally as the battery 54, the opposite end of the battery being grounded.

In the construction of the exciting means 3, the spark gap 34 is placed as close as possible to the cavity resonator, and is connected thereto by a very short length of conductor 37, so that the inductance of the conductor 37 between the gap 34 and the loop 38 is a minimum and the voltage across the loop 38 is a maximum. The plug 45, in cooperation with the tube 44 and the insulator 46, forms a shunt capacitance which is charged through the resistance 49 by the high tension unidirectional source 54 until the voltage between the electrodes 35, 36 is sufficient to cause a breakdown of the gap 34 or produce a discharge between the electrodes. Since the spark gap is placed as close as possible to the input electrode 38, a maximum pulse of exciting voltage due to a current pulse passing through the loop 38 is provided within the resonator 1 to produce, by shock excitation, oscillations of a frequency determined by the position of the inner conductor 6, that is, by the dimensions of the cavity resonator. The coupling is effected by coupling the electromagnetic field of the loop 38 to the cavity at an optimum position therein to establish electromagnetic waves of a frequency determined by the dimensions of the cavity. The resistance 49 is effective to attenuate any back pulse of high frequency voltage. Means are provided for by-passing to ground any ultra high frequency wave which travels outwardly from the cavity resonator 1 along the elements within the tube 44 and comprises a capacitor 54' connected between the conductor connected with the contact 50 and ground.

Means are provided for supplying energy from the cavity resonator 1 to the meter 4 and comprise any suitable output electrode means which may be, for example, a coupling loop 55. Coupling loop 55 is connected at one end to a tubular plug 56 provided in a lateral opening in the outer conductor 7 to form with a tubular connecting member 57 the outer conductor of a non-resonant concentric transmission line connected between the resonator 1 and the meter 4. A wire 58 connected to the coupling loop 55 forms the inner conductor of this line. Preferably, the output line 57, 58 is non-resonant in character so that it has a flat impedance versus frequency characteristic.

The operation of the wavemeter described above may best be explained by reference to the spectrum analyzer shown in block diagram in Fig. 4. This spectrum analyzer may be of the type shown in the above-mentioned copending application of LeRoy Apker or it may be any other suitable spectrum analyzer. In the analyzer of Fig. 4, which is of the type shown in the above-mentioned application of LeRoy Apker, the received wave whose frequency is to be determined is transmitted from an input source, such as an antenna 59, through a high frequency choke 60 to a high frequency mixer 61 where it is combined with a locally produced ultra high frequency oscillation from a variable ultra high frequency oscillator 62. A filter 63, interposed between the mixer 61 and the oscillator 62, provides means to prevent reflection to the oscillator 62 of waves of the mixed frequency obtained through the mixing action of the mixer 61. The constant frequency output wave of the mixer 63 is supplied through a tunable ultra high frequency filter 64 to a second mixer 65 where this constant frequency signal is combined with a second locally produced oscillation of fixed frequency provided by an oscillator 66 and supplied to the mixer 65 through a pair of tunable ultra high frequency filters 67, 68. The mixer 65 combines the two ultra high frequency oscillations provided by the oscillator 66 and the mixer 61 to form a constant, relatively low frequency wave which is supplied through a high frequency choke 69 to an output device which may be, for example, a cathode ray oscilloscope 70.

In a spectrum analyzer of this type, where it is desired to measure input waves which vary over a substantial frequency range, it has been found extremely difficult to provide any means actuated by the control utilized to vary the oscillations of oscillator 62 to provide an accurate indication of the frequency of such oscillations. Of course, the accuracy of the analyzer in determining the frequency of a wave supplied to the antenna 59 is dependent upon the accuracy of the means used to determine the frequency of the wave of the oscillator 62. Our invention provides such an accurate frequency determining means and, in Fig. 4, the shock excited cavity resonator 1 is illustrated as connected by means of conductor 58 through a decoupling resistor 71 to the input side of the choke 60.

In the operation of the analyzer of Fig. 4 employing the wavemeter of our invention, the oscillator 62 is varied over a range of ultra high frequency waves to provide oscillations which are combined in mixer 61 with an input signal, whose frequency may vary over a wide range, supplied to the antenna 59 until a constant frequency wave of the frequency to which the filter 64 is tuned is provided. This constant ultra high frequency wave, in turn, is combined in mixer 65 with the constant ultra high frequency wave from oscillator 66 to provide a relatively low constant frequency wave which gives an indication on the cathode ray oscilloscope 70. The dimensions of the cavity resonator 1 are varied by changing the length of the inner conductor 6 by means of the control knob 28 until a pulse of oscillations is provided, the frequency of which is the same as that of the incoming wave. This condition is indicated by the production on the cathode ray oscilloscope of a pulse of deflections.

The spark exciter described above is useful also for determining resonant points in a broad band transmission system or in other circuits.

Particularly when used in conjunction with a spectrum analyzer to cover the intended transmission range, small variations of Q in such a broad band transmission system may be detected. In the modification of the invention of Fig. 5, our improved spark exciter 3 is shown as being connected by the output conductor 37 to the inner conductor 72 of a coaxial transmission line having a tubular outer conductor 73. The transmission line 72, 73 may be of conventional form and our improved spark exciter is useful in studying the transmission characteristics of this line to determine any resonance points of the line. The outer conductor 73 is grounded so that the wave of the spark exciter 3 is applied between the inner and outer conductor of the transmission line. At the opposite end of the line, the inner and outer conductors are connected to means for measuring the energy transmitted over the line at different frequencies. Such measuring means may be, for example, a spectrum analyzer 74 which employs an indicating instrument 75. The analyzer 74 may be of the type shown in Fig. 4 or of any other suitable type. Since the wave transmitted from the spark exciter 3 has frequency components from very low to very high frequencies, with the use of the analyzer 74 and the indicating instrument 75, the apparatus of Fig. 5 is useful to detect the transmission through the line 72, 73 at all frequencies in the range and give an indication of any increase in Q of the transmission system at any particular frequency of the range.

In the modification of Fig. 6, the spark exciter 3 is shown as connected to a wave guide system to determine the transmission characteristics of this system. The output conductor 37 of the exciter is extended across one end of the wave guide 76 to form an input electrode 77. The wave guide 76 may contain a plurality of discontinuities, such as the radial resonators 78, 79. The transmission characteristic of the wave guide system may be determined by connecting a spectrum analyzer 80 to an output electrode 81 connected across a distant point of the guide, for example, near the opposite end of the guide. The analyzer 80 preferably includes an indicating instrument 82 of the visual type to show any increase in transmission of energy at the particular frequency. It is apparent, of course, that the spark exciter may likewise be employed with a cavity resonator or any other type of transmission system. In each instance, the exciter functions as a low internal impedance generator to supply impulses to the systems, these impulses having a wide frequency spectrum so that the exciter is useful in analyzing broad band transmission systems which are to carry either low or high frequencies. An important advantage of the exciter is that it is capable of withstanding high voltages and supplying useful amounts of energy to a system to be studied.

Another important advantage of our invention is that it provides a high voltage excitation of the cavity resonator 1, especially when the spark gap 34 is located as close as possible to the input to the cavity resonator. Another advantage is that the invention provides a variable frequency pulse generator which gives a high intensity output signal at all frequencies over a very wide band. The repetition rate is controlled by the values of the resistor 49 and the capacitor formed by the members 44—46. Thus, in one construction according to our invention, the output frequency was variable over a range of 500 to 3500 megacycles, the output signals being pulsed at a repetition rate of approximately 20 kilocycles per second. Over this wide frequency band, the output signals were of sufficiently high intensity and of relatively uniform value that they provided a good calibrating means for the analyzer.

Another important advantage of our invention is that the generator for ultra high frequencies which varies over a wide range is adjustable by a very simple control means.

While the invention has been described by reference to a particular embodiment thereof, it will be understood that numerous modifications may be made by those skilled in the art without departing from the invention. We therefore aim in the appended claims to cover all such equivalent variations as come within the true spirit and scope of our invention.

What we claim as new and desire to secure by Letters Patent of the United States, is:

1. A pulse generator comprising a cavity resonator having an input electrode and an output electrode, a spark gap connected to said input electrode, means for supplying a unidirectional potential to said spark gap, and a capacitance connected between said last means and said gap whereby repeated pulses of exciting potential are supplied to said resonator.

2. A generator for providing ultra high frequency waves comprising a cavity resonator having an input electrode and an output electrode, a spark gap serially connected with said input electrode external to said resonator, means adapted to supply a unidirectional potential to said gap, and a capacitance connected between said means and said gap, said resonator being adjustable in dimension whereby pulses of ultra high frequency signals variable over a wide frequency range are supplied to said output electrode.

3. In a wavemeter for ultra high frequency signals comprising a cavity resonator having an input electrode and an output electrode, said resonator comprising a tubular outer conductor and a centrally disposed axially positionable inner conductor, said resonator having an end wall and said inner conductor having one of its ends in variable spaced relation with said end wall, a spark gap connected to said input electrode external to said resonator, means adapted to supply unidirectional potential to said gap, a capacitance connected between said last means and said gap, means for varying the spacing between the end of said inner conductor and said end wall to vary the resonance frequency of said resonator, and means connected with said last means for indicating the resonance frequency of said resonator.

4. In combination, a cavity resonator comprising a tubular outer conductor and a centrally disposed inner conductor, said resonator having an end wall connected across said outer conductor and said inner conductor having one of its ends in spaced relation with respect to said end wall, means for exciting said resonator comprising an input electrode extending into said resonator through a lateral opening in said outer conductor, a spark gap serially connected with said input electrode, means adapted to supply high voltage unidirectional potential to said gap, a capacitor connected between said last means and said gap, output electrode means connected with said resonator, and means for adjusting the spacing between the end of said inner conductor and said end wall to vary the resonance frequency of said resonator whereby high frequency waves variable over a wide range are supplied to said output electrode.

5. An ultra high frequency pulse generator comprising a cavity resonator having an input electrode and an output electrode, said resonator being defined by a closed metallic member and said input electrode extending through a lateral opening in said member, a tubular conductor connected with said lateral opening, a pair of spark electrodes supported within said tubular conductor, one of said spark electrodes being connected with said input electrode, a centrally positioned conductor connected with the other of said spark electrodes, insulating means interposed between said centrally positioned conductor and said tubular conductor to form a capacitance connected between said other spark electrode and said metallic member, resistance means supported within said tubular conductor and serially connected at one end with said centrally positioned conductor, and means adapted to supply unidirectional potential to the other end of said resistance means whereby pulses of high intensity current are supplied to said input electrode.

6. An ultra high frequency pulse generator comprising a cavity resonator having an input electrode and an output electrode, said resonator being defined by a closed metallic member and said input electrode extending through a lateral opening in said member, a tubular conductor connected with said lateral opening, a pair of spark electrodes supported within said tubular conductor, one of said spark electrodes being connected with said input electrode, a centrally positioned conductor connected with the other of said spark electrodes, insulating means interposed between said centrally positioned conductor and said tubular conductor to form a capacitance connected between said other spark electrode and said metallic member, resistance means supported within said tubular conductor and serially connected at one end with said centrally positioned conductor, means adapted to supply unidirectional potential to the other end of said resistance means, and a by-pass capacitance connected between said other end and said tubular conductor whereby pulses of high intensity current are supplied to said electrode to establish high frequency electromagnetic waves in said resonator.

7. A generator of electric pulses having a broad frequency characteristic comprising a tubular conductive member, a spark gap supported within said member and insulated therefrom, an output electrode means connected to one terminal of said gap, a capacitance supported within said member and connected between the other terminal of said gap and said member, and means adapted to impress a unidirectional potential between said capacitance and said member.

8. A generator of electric pulses having a broad frequency characteristic comprising a tubular conductive member, a spark gap supported within said member and insulated therefrom, an output electrode means connected to one terminal of said gap, a capacitance supported within said member and connected between the other terminal of said gap and said member, a resistance supported within said member and having one of its terminals connected to said capacitance, and means adapted to supply unidirectional potential to the other terminal of said resistance.

9. A wave generator comprising a cavity resonator, a spark gap, means for energizing said spark gap, means for coupling the output energy of said spark gap substantially directly to said cavity resonator, and means for tuning said cavity resonator.

10. An arrangement according to claim 9 wherein said cavity resonator comprises a coaxial cavity resonator, and said means for coupling comprises an electrode.

11. An arrangement according to claim 10 wherein said spark gap is energized periodically to produce a pulsed output.

12. An arrangement according to claim 9 wherein said cavity resonator comprises a coaxial cavity resonator substantially a quarter wavelength long, a load circuit coupled to one end of said cavity resonator, the other end of said cavity resonator being open circuited.

13. An arrangement according to claim 12 further comprising a transmission line stub coupled in parallel with said cavity resonator substantially at its open end.

LE ROY APKER.
JOSEPH KAHNKE.

REFERENCES CITED

The following references are of record in the file of this patent:

UNITED STATES PATENTS

| Number | Name | Date |
| --- | --- | --- |
| 2,270,479 | Schroted | Jan. 20, 1942 |
| 2,297,436 | Scholz | Sept. 29, 1942 |
| 2,349,440 | Lavoie | May 23, 1944 |
| 2,365,207 | Moles | Dec. 19, 1944 |
| 2,402,663 | Ohl | June 25, 1946 |
| 2,405,217 | Labin | Aug. 6, 1946 |
| 2,418,121 | Hoffmann | Apr. 1, 1947 |
| 2,439,388 | Hansen | Apr. 13, 1948 |